United States Patent
Baltes et al.

(10) Patent No.: US 9,866,542 B2
(45) Date of Patent: Jan. 9, 2018

(54) RESPONDING TO ELECTRONIC IN-VEHICLE INTRUSIONS

(71) Applicant: GM Global Technology Operations LLC, Detroit, MI (US)

(72) Inventors: Kevin M. Baltes, Wixom, MI (US); Thomas M. Forest, Macomb, MI (US); Joseph E. Ploucha, Commerce Township, MI (US)

(73) Assignee: GM Global Technology Operations, Detroit, MI (US)

( * ) Notice: Subject to any disclaimer, the term of this patent is extended or adjusted under 35 U.S.C. 154(b) by 53 days.

(21) Appl. No.: 14/607,910

(22) Filed: Jan. 28, 2015

(65) Prior Publication Data

US 2016/0219028 A1  Jul. 28, 2016

(51) Int. Cl.
H04L 29/06    (2006.01)
H04W 12/12   (2009.01)
H04W 12/06   (2009.01)
H04L 29/08    (2006.01)

(52) U.S. Cl.
CPC .......... H04L 63/08 (2013.01); H04L 63/0227 (2013.01); H04L 63/1408 (2013.01); H04L 63/1441 (2013.01); H04W 12/12 (2013.01); H04L 67/12 (2013.01); H04W 12/06 (2013.01)

(58) Field of Classification Search
CPC . H04L 63/08; H04L 63/1441; H04L 63/1408; H04L 63/0227; H04L 67/12; H04W 12/12; H04W 12/06
See application file for complete search history.

(56) References Cited

U.S. PATENT DOCUMENTS

| | | | | |
|---|---|---|---|---|
| 6,408,391 B1 * | 6/2002 | Huff | ..... | H04L 63/1408 726/22 |
| 7,484,008 B1 * | 1/2009 | Gelvin | ..... | H04L 67/12 701/408 |
| 2003/0009271 A1 * | 1/2003 | Akiyama | ..... | G06F 21/335 701/29.6 |
| 2004/0193892 A1 * | 9/2004 | Tamura | ..... | H04L 63/1458 713/182 |
| 2009/0170539 A1 * | 7/2009 | Kortge | ..... | H04L 63/1441 455/466 |
| 2010/0017543 A1 * | 1/2010 | Preston | ..... | B60R 25/00 710/16 |
| 2010/0082180 A1 * | 4/2010 | Wright | ..... | B60W 50/0098 701/1 |
| 2010/0198513 A1 * | 8/2010 | Zeng | ..... | B60W 40/02 701/300 |
| 2011/0080302 A1 * | 4/2011 | Muthaiah | ..... | H04L 47/10 340/903 |

(Continued)

*Primary Examiner* — Hosuk Song
*Assistant Examiner* — J. Brant Murphy
(74) *Attorney, Agent, or Firm* — Christopher DeVries; Reising Ethington P.C.

(57) ABSTRACT

A system and method of responding to unauthorized electronic access to a vehicle includes: receiving data indicating unauthorized electronic access to electronic hardware in the vehicle; initiating an electronic hardware countermeasure in response to the unauthorized electronic access; generating a command set that instructs at least a portion of the electronic hardware to implement the electronic hardware countermeasure; and communicating the command set to the portion of the electronic hardware.

18 Claims, 2 Drawing Sheets

(56) References Cited

U.S. PATENT DOCUMENTS

| | | | | |
|---|---|---|---|---|
| 2013/0227650 A1* | 8/2013 | Miyake | H04L 63/08 | 726/3 |
| 2014/0226673 A1* | 8/2014 | Hirashima | H04L 12/40006 | 370/401 |
| 2015/0278002 A1* | 10/2015 | Aoki | G06F 11/0739 | 714/55 |
| 2016/0019389 A1* | 1/2016 | Yan | G06F 21/554 | 726/23 |
| 2016/0021127 A1* | 1/2016 | Yan | G06F 21/554 | 726/23 |
| 2016/0080401 A1* | 3/2016 | Zhou | H04L 63/1416 | 726/1 |

* cited by examiner

RESPONDING TO ELECTRONIC IN-VEHICLE INTRUSIONS

TECHNICAL FIELD

The present invention relates to controlling access to vehicle electronics and, more specifically, to mechanisms that respond to unauthorized access to the vehicle electronics.

BACKGROUND

Vehicles are manufactured with an array of electronic hardware that regulates vehicle function. The electronic hardware includes sensors, electronic control units (ECUs; also called vehicle systems modules), vehicle telematics units, as well as other devices that communicate with each other over a communications bus. The devices included with the electronic hardware carry out not only intra-vehicle communications but can also accept instructions from outside of the vehicle. For instance, vehicles commonly include an on-board diagnostics (OBD) input that can be used to provide instructions to or receive data from the electronic hardware. Vehicles also can remotely receive instructions and communicate data using wireless communications techniques implemented by the vehicle telematics unit and other ECUs so equipped. By maintaining portals providing access to the electronic hardware, it is possible that the portals can be used for malicious or other unauthorized access to the electronic hardware. But the vehicle can detect input to the electronic hardware that is unauthorized. However, once the vehicle detects the presence of harmful input determining how to ameliorate the harmful input can be challenging.

SUMMARY

According to an embodiment of the invention, there is provided a method of responding to unauthorized electronic access to a vehicle. The method includes receiving data indicating unauthorized electronic access to electronic hardware in the vehicle; initiating an electronic hardware countermeasure in response to the unauthorized electronic access; generating a command set that instructs at least a portion of the electronic hardware to implement the electronic hardware countermeasure; and communicating the command set to the portion of the electronic hardware.

According to another embodiment of the invention, there is provided a method of responding to unauthorized electronic access to a vehicle. The method includes detecting an abnormal condition of electronic hardware in the vehicle; determining that the abnormal condition is caused by unauthorized access to the electronic hardware; initiating an electronic hardware countermeasure in response to the abnormal condition; generating a command set that instructs at least a portion of the electronic hardware to implement the electronic hardware countermeasure; and communicating the command set to the portion of the electronic hardware.

According to yet another embodiment of the invention, there is provided a method of responding to unauthorized electronic access to a vehicle. The method includes detecting an abnormal condition of electronic hardware in the vehicle; identifying a cause of the abnormal condition; selecting an electronic hardware countermeasure based on the cause of the abnormal condition; generating a command set that instructs at least a portion of the electronic hardware to implement the electronic hardware countermeasure; and communicating the command set to the portion of the electronic hardware.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENTS

The system and method described below detects unauthorized access to electronic hardware in a vehicle and deploys an appropriate intra-vehicle response to the unauthorized access in the form of an electronic hardware countermeasure. Vehicles can implement an intrusion detection system that monitors electronic hardware to identify unauthorized access to electronic hardware or an unauthorized attempt to access that hardware. In response, the vehicle can protect the electronic hardware using one or more countermeasures designed to minimize the effect of the unauthorized access. The intrusion detection system can identify a portion of the electronic hardware or a vehicle function regulated by the electronic hardware that is affected by the unauthorized access and select a particular countermeasure based on the electronic hardware, the vehicle function, or both. The countermeasures can also be used along with a data collection mechanism that indicates the identity of the entity responsible for the unauthorized access and/or helps prevent such unauthorized behavior in the future.

Figure 1:
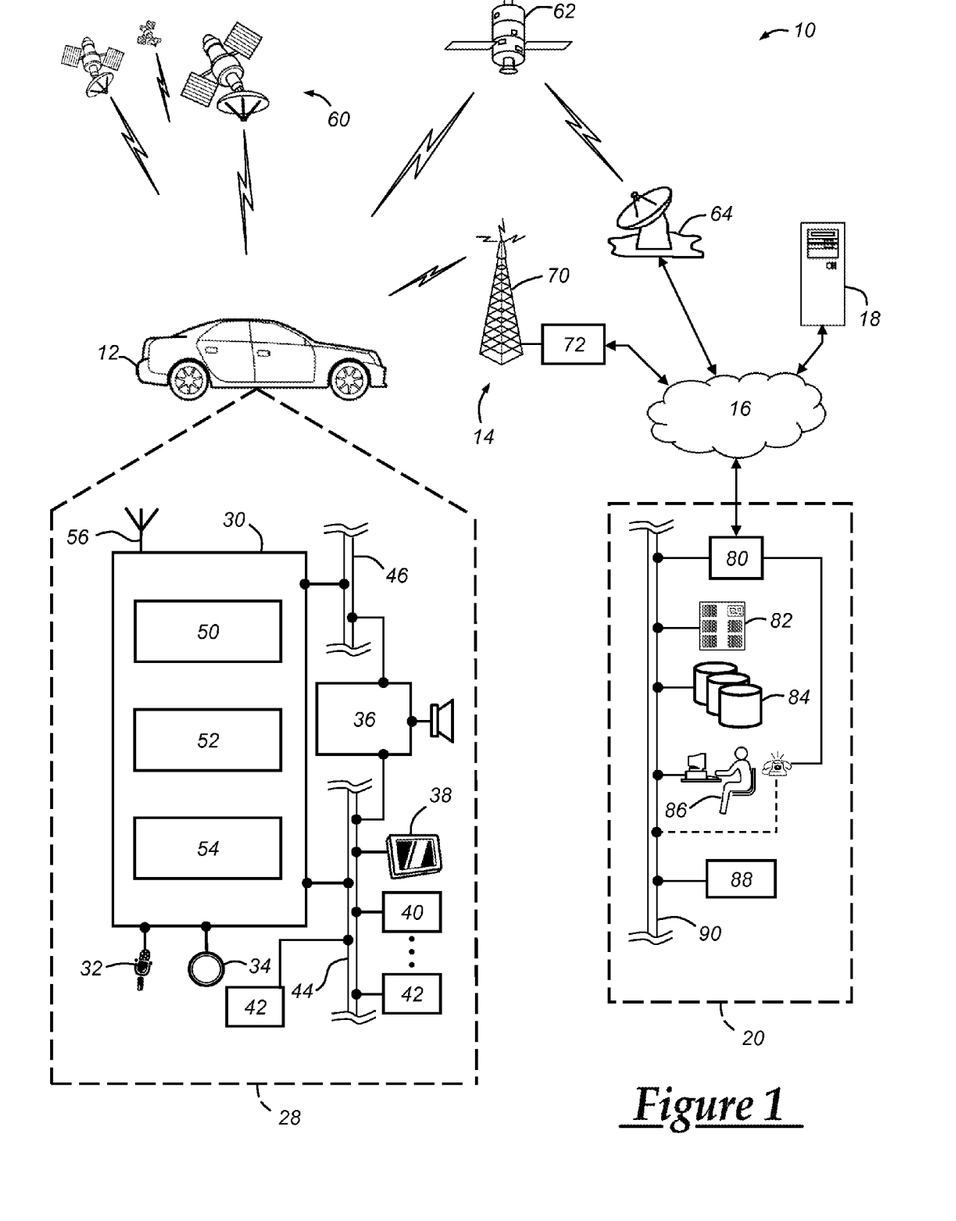
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible. The DTCs as well as other data can be obtained from a data plug 48 that is hardwired to the vehicle 12. In one implementation, the data socket 48 can be an OBD socket as is known to those skilled in the art. Or in another implementation, the data socket 48 can be a universal serial bus (USB) socket capable of receiving a wired data connection.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. The audio system 36 can also include a data gateway that manages the communication of data between the vehicle bus 44 and the entertainment bus 46. However, it should be appreciated that more than one gateway can be used and that the gateway can be implemented at other locations than the audio system 36. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
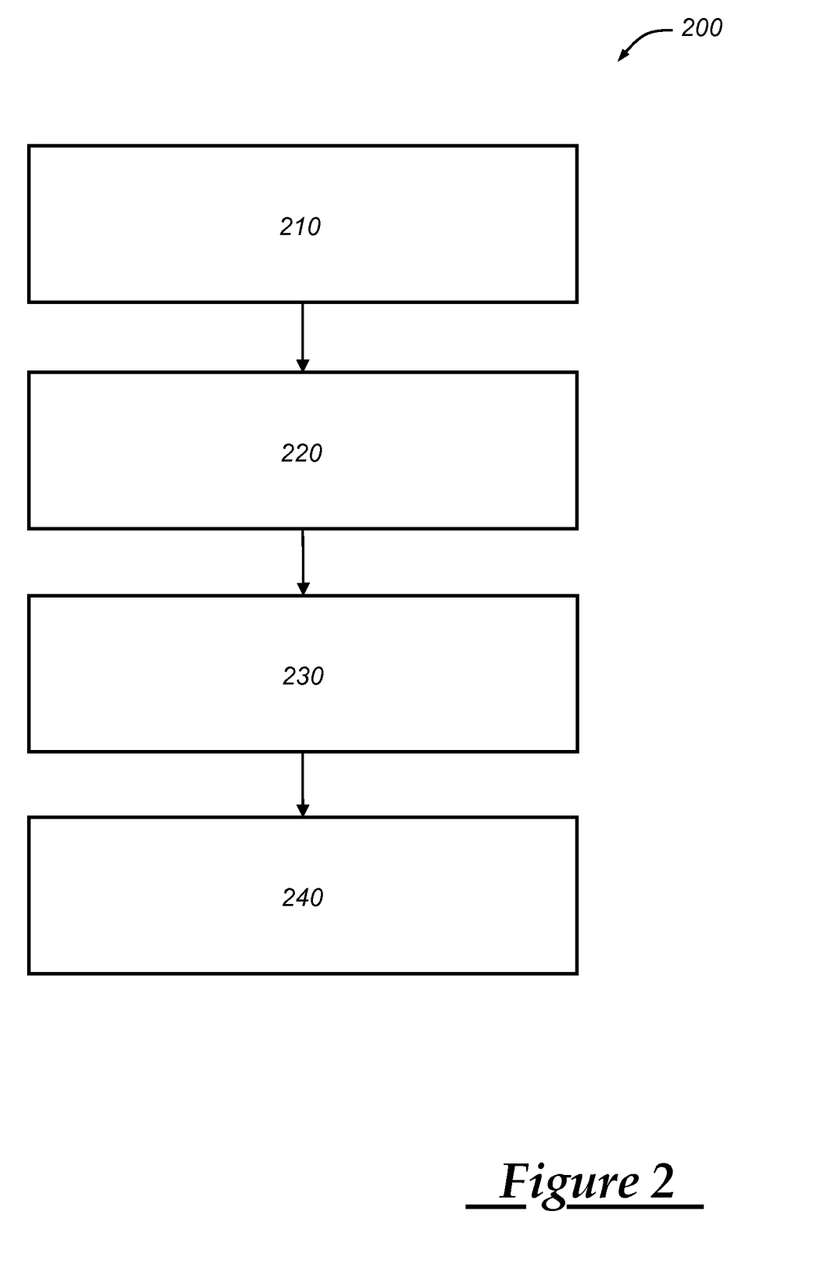
FIG. 2 is a flow chart depicting an embodiment of a method of responding to unauthorized electronic access to a vehicle.

Turning now to FIG. 2, there is shown an embodiment of a method 200 of responding to unauthorized electronic access to the vehicle 12. The method 200 begins at step 210 by detecting an abnormal condition of electronic hardware in the vehicle 12. The vehicle 12 can monitor for unauthorized access to electronic hardware, such as vehicle electronics 28, using intrusion detection systems. In one implementation, the processor 52 of the vehicle telematics unit 30 can access computer-readable instructions stored in the memory devices 54 that direct the processor 52 to monitor operating aspects of the vehicle electronics 28. Vehicles can detect unauthorized access or attempts to access vehicle electronics 28 by establishing a range of characteristic behavior for different aspects of the electronics and monitoring the electronics for indications that it is performing outside of the established range.

The operating aspects of the vehicle electronics 28 can include the frequency with which message types are transmitted via the vehicle bus 44. For example, the processor 52 can monitor how many messages are transmitted to an engine control module over a unit of time. In one possible instance, the processor 52 could detect that more than three messages are sent over the vehicle bus 44 in one millisecond (ms). The rate of message transmission can be compared with a threshold indicating normal operation stored in the memory device 54. If the rate is above that threshold (e.g., one message per ms), then the processor 52 can determine that unauthorized access to the vehicle electronics 28 has occurred. Or in another example, the processor 52 can identify an absence of messages over the vehicle bus 44 relating to a vehicle function. Vehicle functions can include aspects of vehicle operation like braking, throttle control, and steering as well as control of the audio system 36 and other infotainment features, to name a few. It should be appreciated that an intrusion detection system can be implemented apart from the processor 52 using a separate VSM 42 connected to the vehicle bus 44 and dedicated to monitoring the operating aspects of the vehicle electronics 28. In that case, the processor 52 can receive data from the VSM 42 indicating unauthorized electronic access to vehicle electronics 28 in the vehicle 12 has occurred. It can also be helpful to identify attempted unauthorized access as well as unauthorized access that has ultimately been successful. The method 200 proceeds to step 220.

At step 220, a type of unauthorized access is identified. Depending on the abnormal behavior detected, it is possible to determine which portion of the vehicle electronics 28 has been affected or targeted by the unauthorized access. For instance, the processor 52 can determine that the type of unauthorized access relates to a vehicle function. Using vehicle braking as an example of the vehicle function that could be affected, the processor 52 could detect an abnormally high number of messages directed to a VSM 42 responsible for vehicle braking Based on the detected number of messages relating to vehicle braking, the processor 52 can determine that the type of unauthorized access is vehicle-braking related. The processor 52 can then select countermeasures to deploy that are targeted to the VSM 42 and/or a portion of the vehicle electronics 28 that are responsible for vehicle braking. This will be discussed in more detail below. The method 200 proceeds to step 230.

At step 230, an electronic hardware countermeasure can be initiated in response to the abnormal condition. Electronic hardware countermeasures can be implemented using an array of techniques. In one example, countermeasures can be initiated to stop invasive communications on the vehicle bus 44 and/or entertainment bus 46. This could be accomplished by shorting the terminals of the affected bus. This can be carried out more readily when an abnormal condition is detected on one portion or one bus included among a system or plurality of busses. In another example, the vehicle bus 44 and/or the entertainment bus 46 could be flooded with messages generated at the vehicle 12 to prevent malicious messages from causing damage. Other implementations of electronic hardware countermeasures include initiating a countermeasure message (also referred to as a command set) sent over the vehicle bus 44 or entertainment bus 46 that instructs elements of the vehicle electronics 28 receiving it, such as VSMs 42, to handle incoming messages received over either bus in a particular way.

The countermeasure message can instruct vehicle electronics 28 to ignore all incoming messages for a predetermined amount of time. Or the countermeasure message can instruct the vehicle electronics 28 to ignore messages relating to a particular subject. For instance, the countermeasure message can instruct the vehicle electronics 28 to ignore messages that are safety-related, safety-related above a particular importance level, or messages originating from an identifiable portion of the vehicle electronics 28. The countermeasure message can instruct elements of the vehicle electronics 28 to ignore only messages that carry a particular message identifier. It is also possible for the countermeasure message to restrict individual vehicle functions or processes. That is, the countermeasure message can be sent to elements of the vehicle electronics 28 and direct the electronics 28 to cease performing a function, such as vehicle diagnostics, while allowing others. Further, the countermeasure message can direct the vehicle electronics 28 or some portion of those electronics to implement a tiered or hierarchical set of performance modes that transition the electronics 28 over time from fully functional to some lesser state of functionality in stages. This can help smooth the transition of the vehicle electronics 28 from fully functioning to limited functionality.

The countermeasure message can be designed such that its content cannot be overridden by an "all clear" message sent by an attacker that overrides the countermeasure message. One way of ensuring that the countermeasure message is not overridden is to program the elements of the vehicle electronics 28 that existence of the countermeasure message indicates unauthorized access. A heightened alert status created by the existence of the countermeasure message may then only be removed by a message generated outside of the vehicle, such as the computer 18 or call center 20. Individual elements of the vehicle electronics 28 (e.g., VSM 42) can include computer-readable instructions that direct the electronics 28 to implement countermeasures despite an inability to receive communications over a bus. In some implementations, the countermeasures can involve instructing the vehicle electronics 28 or individual elements comprising those electronics to change their functionality in response to the countermeasure message in a way that makes the vehicle electronics 28 less susceptible to damage from unauthorized access. For example, the vehicle electronics 28 can be programmed to use default values rather than values received from a bus, lower control gain values to be less sensitive to information received via a bus, or switch to a backup mode that offers limited functionality so long as that functionality does not require outside input that could be compromised by an attacker.

It is also possible to implement authenticated countermeasure messages. For example, when the vehicle electronics 28 receives a countermeasure message that indicates a threat exists or that no threat exists, the message can be cryptographically authenticated using a variety of techniques. For instance, after receiving the countermeasure message, the vehicle electronics 28 can authenticate the contents of that message by verifying the entity that sent it using an attached message authentication coded (MAC).

Electronic hardware countermeasures can also be implemented via active frame cancellation to eliminate data frame communicated over the vehicle bus 44, the entertainment bus 46, or both. Data frames determined to represent unauthorized access can be eliminated using one of the devices included in the vehicle electronics 28 or each device in the vehicle electronics 28 is instructed to cancel data frames representing unauthorized access.

Gateways can use electronic hardware countermeasures to control transmission of data relating to unauthorized access of the electronics hardware and implement the active frame cancellation. In one implementation, the gateways can be CAN bus data gateway modules that regulate the flow of data messages between the vehicle bus 44 and the entertainment bus 46. The gateway modules can be implemented in the vehicle telematics unit 30 or as stand-alone devices. When detecting a message related to unauthorized access, the gateway can block the message using its security policy and then update its security policy to prevent similar messages from being sent over the bus. After detecting data relating to unauthorized access, the gateway can then alert other devices in the vehicle electronics 28 and/or other networks unaffected by the unauthorized access. While the gateways have been described with respect to the vehicle and entertainment busses and implemented at the vehicle telematics unit 30, it should be appreciated that the gateways can be implemented elsewhere among devices included in the vehicle electronics 28 and regulate data transmissions with respect to other types of busses.

The countermeasures can be implemented for a defined period of time and the period can be defined in different ways. For instance, the countermeasures can be implemented until further notice but they can also be implemented until the vehicle 12 is "powercycled" or turned off and then back on again. It is also possible to determine if intrusions are detected during a predetermined percentage of power-cycles and maintain the countermeasures when the number of detected intrusions are above that percentage. Or it is possible to maintain the countermeasures for a predetermined amount of time (e.g., 3 days, 10 seconds, etc.). An electronic hardware countermeasure can be selected based on the type of the abnormal condition. However, it is also possible to deploy electronic hardware countermeasures to the vehicle electronics 28 without first determining the type of unauthorized access that has occurred. The method 200 proceeds to step 240.

At step 240, a command is generated that instructs at least a portion of the electronic hardware to implement the electronic hardware countermeasure. The command is then communicated to a portion of the electronic hardware. Any portion of the vehicle electronics 28 can be dedicated to generating the instructional command in such a way that the present method 200 is implemented in a distributed way. It is also possible to identify one portion of the vehicle electronics 28 as responsible for generating instructional commands that implement the electronic hardware countermeasures. It should be appreciated that the generated command need not be sent over a vehicle bus. For example, the VSM 42 could initiate an electronic hardware countermeasure in response to received data indicating that unauthorized access has occurred. The VSM 42 could then generate and communicate a command set internally that places the VSM 42 in reduced state of functionality to make it less sensitive to outside influences (e.g., relying on internal values rather than those received via a bus, lowering control gains to be less sensitive to information received via a bus, and/or implementing a reduced-function mode that offers services not dependent on outside information).

The command can also cause the presentation of a visual and/or audible alert that informs a vehicle occupant that unauthorized access has been detected at the vehicle 12. The electronic hardware countermeasure and/or the alert can be followed or accompanied by the vehicle restricting use or operation of various vehicle functions. For instance, the vehicle telematics unit 30 can disable wireless communications or restrict access to vehicle controls in response to the command. It is also possible to transmit the identity of the vehicle 12, such as a vehicle identification number (VIN) or mobile dialed number (MDN), to a central facility where vehicles 12 that have been accessed without permission can be more closely monitored. The vehicle can permit vehicle occupants to respond to output or questions generated by the vehicle electronics 28 that can direct the electronics 28 to reassess the intrusion and speed the return to full functionality. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of responding to unauthorized electronic access to a vehicle, comprising the steps of:
receiving an indication of unauthorized electronic access to electronic hardware in the vehicle, wherein the indication of the unauthorized electronic access is based on a comparison of a frequency with which messages are transmitted to a threshold frequency or based on a determination that the frequency with which the messages are transmitted is outside a range of frequencies, wherein the messages are related to at least one of the following: braking, throttle control, steering, and/or an audio system;
identifying a type of unauthorized access, wherein the identification includes:
determining a vehicle function to which the unauthorized electronic access is related; and
identifying at least one vehicle system module that carries out the vehicle function;
initiating an electronic hardware countermeasure in response to the unauthorized electronic access, wherein the electronic hardware countermeasure further comprises the step of instructing elements of vehicle electronics to ignore all incoming messages for a predetermined amount of time that are directed to the at least one identified vehicle system module;
obtaining a command set that instructs at least a portion of the electronic hardware to implement the electronic hardware countermeasure; and
communicating the command set to the portion of the electronic hardware.

2. The method of claim 1, wherein the command set further comprises instructing a portion of the electronic hardware to: rely on internal values rather than those received via a vehicle bus, lower control gains to be less sensitive to information received via a vehicle bus, or implement a reduced-function mode that offers services not dependent on incoming data.

3. The method of claim 1, wherein the electronic hardware countermeasure further comprises flooding a vehicle bus with data messages.

4. The method of claim 1, wherein the electronic hardware countermeasure further comprises ignoring messages relating to the vehicle function.

5. The method of claim 1, wherein the command set instructs a data gateway to selectively permit communication of data messages over a vehicle bus.

6. The method of claim 1, wherein the command set instructs a data gateway to alert a portion of the electronic hardware communicating via a first vehicle bus that the received data indicates unauthorized electronic access at another portion of the electronic hardware communicating via a second vehicle bus.

7. The method of claim 1, wherein the command set is cryptographically authenticated.

8. A method of responding to unauthorized electronic access to a vehicle, comprising the steps of:
detecting an abnormal condition of electronic hardware in the vehicle by establishing a range of characteristic behavior for different operating aspects of the electronic hardware and monitoring the electronic hardware for indications that the electronic hardware is performing outside of the established range, and wherein the monitoring of the electronic hardware includes obtaining one or more values of at least one of the different operating aspects of the electronic hardware and comparing the obtained value(s) to one or more threshold values;
determining that the abnormal condition is caused by unauthorized access to the electronic hardware based on the comparison of the obtained value(s) to the threshold value(s);
initiating an electronic hardware countermeasure in response to the abnormal condition, wherein the electronic hardware countermeasure further comprises flooding a vehicle bus with data messages;
generating a command set that instructs at least a portion of the electronic hardware to implement the electronic hardware countermeasure; and
communicating the command set to the portion of the electronic hardware.

9. The method of claim 8, wherein the command set further comprises instructing a portion of the electronic hardware to: rely on internal values rather than those received via a vehicle bus, lower control gains to be less sensitive to information received via a vehicle bus, or implement a reduced-function mode that offers services not dependent on incoming data.

10. The method of claim 8, wherein the electronic hardware countermeasure further comprises instructing elements of vehicle electronics to ignore all incoming messages for a predetermined amount of time.

11. The method of claim 8, wherein the electronic hardware countermeasure further comprises ignoring messages relating to a particular function.

12. The method of claim 8, wherein the command set instructs a data gateway to selectively permit communication of data messages over a vehicle bus.

13. The method of claim 8, wherein the command set instructs a data gateway to alert a portion of the electronic hardware communicating via a first vehicle bus that the received data indicates unauthorized electronic access at another portion of the electronic hardware communicating via a second vehicle bus.

14. A method of responding to unauthorized electronic access to a vehicle, comprising the steps of:
detecting an abnormal condition of electronic hardware in the vehicle;
identifying a type of abnormal condition;
selecting an electronic hardware countermeasure based on the type of the abnormal condition;
generating a command set that instructs a vehicle system module to implement the electronic hardware countermeasure;
communicating the command set to the vehicle system module; and
carrying out the electronic hardware countermeasure for a defined period of time, wherein the defined period of time is based on: when a notice is received by the vehicle system module, when the vehicle is turned off and subsequently turned on, or a predetermined amount of time;
wherein the electronic hardware countermeasure further comprises flooding a vehicle bus with data messages.

15. The method of claim 14, wherein the command set further comprises instructing a portion of the electronic hardware to: rely on internal values rather than those received via a vehicle bus, lower control gains to be less sensitive to information received via a vehicle bus, or implement a reduced-function mode that offers services not dependent on incoming data.

16. The method of claim 14, wherein the electronic hardware countermeasure further comprises stopping communications via a vehicle bus.

17. The method of claim 14, wherein the electronic hardware countermeasure further comprises ignoring messages relating to a particular function.

18. The method of claim 14, wherein the command set instructs a data gateway to alert a portion of the electronic hardware communicating via a first vehicle bus that the received data indicates unauthorized electronic access at another portion of the electronic hardware communicating via a second vehicle bus.

* * * * *